United States Patent Office 2,874,669
Patented Feb. 24, 1959

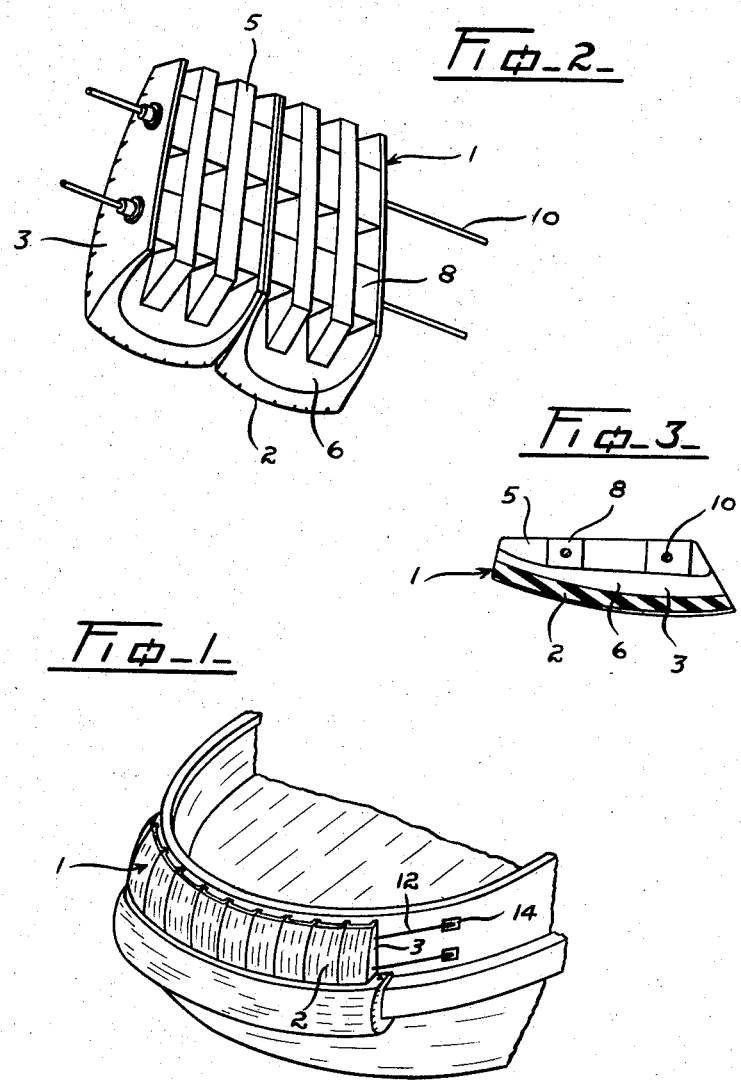

2,874,669
SHIPS' BUMPERS
Einar Norman, Vancouver, British Columbia, Canada
Application February 7, 1956, Serial No. 564,012
2 Claims. (Cl. 114—219)

My invention relates to improvements in ship's bumpers.

The objects of the invention are to provide a ship's bumper which is capable of being trained around the hull of a ship at or above the sheer strake and under the gunwale and be held in intimate contact with the outer hull surface either around the stern or on either side where the horizontal curvature is considerably less.

Further objects are to provide a structure which will stand considerable distortion in collision before reaching its maximum compression and also to provide a bumper which will withstand greater impact or other compression shock without breakdown than the present conventional bumpers now in use.

A still further object is to provide a bumper capable of assembly for ship's hull areas, which bumper is particularly suited for use on tugs and commercial fishing vessels and serves to protect the ship against the frequent abuses that they are generally subject to.

Referring to the accompanying drawings:

Figure 1 is a perspective view of the stern quarter of a tug or a fishing vessel fitted with the invention.

Figure 2 is a perspective view of a section of the bumper.

Figure 3 is a sectional view of the bumper taken lengthwise of the tread portion of the bumper sections.

In the drawings like characters of reference indicate corresponding parts in each figure.

The numeral 1 indicates an arcuate section or unit component of the invention. Each section of the bumper consists of a segment or circumferential portion of a pneumatic tire including the tread portion 2 and two side walls 3. Housed within each of the segments and extending circumferentially thereof is one or more heavy ribs 5 which are in depth somewhat less than the depth of the arcuate section, so as to leave a space 6 between the outer edge of the rib and the inner face of the tread portion 2, see Figure 3. These ribs are preferably cut from tread portions of tires and would therefore be provided with fabric reinforcing to prevent breakdown on repeated impact. Spacer blocks 8, likewise of resilient material, are disposed at spaced intervals of the length of the ribs 5. These spacer blocks are disposed between each pair of ribs and also between the ribs and the side walls 3.

Bolts or cables 10 pass through each of the sections 1 and also through each transverse row of spacer blocks 8 and through the ribs to bind the several parts together and to retain the ribs spaced from the inner face of the tread portion 2, as at 6.

Where a bumper is to be made of from one to three segments and adapted to be used in a position where the bumper as a whole is substantially straight, as on the side of a hull, bolts would form a perfectly satisfactory fastening means for the components of the bumper, but where the bumper consists of a number of sections 1 and is required to fit around a sharply curved portion or the stern of a vessel, as shown in Figure 1, cables would form a better fastening than the bolts and would serve to hold the several segments in firm contact with the hull. The cables used would be extended beyond the bumper sections, as at 12, see Figure 1, and be connected at their extremities to suitable anchorage fittings 14 to retain the bumper in position. With each section having its side walls held against spreading by the fastening means 10, a substantially heavy thrust would need to be applied to the tread portion of a section before it would collapse to the point where it would come into contact with either of the ribs or the spacer blocks, this thrust would involve time and result in an initial slowing down of one of the colliding vessels or devices and reduce the impact shock resulting when tread portion and ribs do meet, consequently the shock can be normally absorbed without detrimental effect by the said ribs or tread portion.

What I claim as my invention is:

1. A ship's bumper comprising a short segment of a pneumatic tire including a portion of the tire tread and portions of the side walls of said tire, the side wall and tire tread portions being substantially of similar length, a plurality of ribs of resilient material extending between said side wall portions and lengthwsie of the tire tread of the segment, spacer blocks maintaining the ribs in spaced relation to the side walls, said spacer blocks, ribs and side walls being united together by a tension member extending transversely through the side walls, the ribs and the spacer blocks.

2. A ship's bumper as claimed in claim 1, wherein the ribs are so supported by the tension member as to define spaces between their edges and the tire tread portion of the segment.

References Cited in the file of this patent
UNITED STATES PATENTS
2,562,957   Sipkin et al. _____ Aug. 7, 1951
FOREIGN PATENTS
17,227      Great Britain _____ of 1897
1,035,216   France _____ Apr. 15, 1953